(12) United States Patent
Bessho et al.

(10) Patent No.: US 10,323,694 B2
(45) Date of Patent: Jun. 18, 2019

(54) WORK VEHICLE

(71) Applicant: Kubota Corporation, Osaka-shi (JP)

(72) Inventors: Hiroki Bessho, Sakai (JP); Jun Yoshida, Sakai (JP); Hiroshi Takagi, Sakai (JP)

(73) Assignee: Kubota Corporation, Osaka (JP)

( * ) Notice: Subject to any disclaimer, the term of this patent is extended or adjusted under 35 U.S.C. 154(b) by 181 days.

(21) Appl. No.: 15/622,571

(22) Filed: Jun. 14, 2017

(65) Prior Publication Data

US 2017/0370422 A1    Dec. 28, 2017

(30) Foreign Application Priority Data

Jun. 27, 2016   (JP) .................................. 2016-126878

(51) Int. Cl.

| | |
|---|---|
| *F16D 11/14* | (2006.01) |
| *F16H 63/30* | (2006.01) |
| *B60K 17/34* | (2006.01) |
| *B60K 17/342* | (2006.01) |
| *B60K 17/346* | (2006.01) |
| *B60K 17/35* | (2006.01) |
| *B60K 23/08* | (2006.01) |
| *F16D 11/00* | (2006.01) |
| *B62D 63/04* | (2006.01) |
| *F16H 3/08* | (2006.01) |
| *F16H 37/02* | (2006.01) |

(52) U.S. Cl.
CPC ............. *F16D 11/14* (2013.01); *B60K 17/34* (2013.01); *B60K 17/342* (2013.01); *B60K 17/3467* (2013.01); *B60K 17/3505* (2013.01); *B60K 23/0808* (2013.01); *F16H 63/30* (2013.01); *B60K 2023/085* (2013.01); *B60K 2023/0825* (2013.01); *B62D 63/04* (2013.01); *F16D 2011/002* (2013.01); *F16H 2003/0811* (2013.01); *F16H 2037/028* (2013.01); *F16H 2063/3093* (2013.01)

(58) Field of Classification Search
None
See application file for complete search history.

(56) References Cited

U.S. PATENT DOCUMENTS

2003/0024335 A1*  2/2003  Matsumoto ............. F16D 23/06
                                                        74/333
2009/0065279 A1    3/2009  Bessho et al.

FOREIGN PATENT DOCUMENTS

JP            200967081 A     4/2009

* cited by examiner

*Primary Examiner* — Timothy Hannon
(74) *Attorney, Agent, or Firm* — The Webb Law Firm

(57) ABSTRACT

A work vehicle including: a transmission unit that is provided with, on a shaft that is provided in a power transmission path leading from an input shaft to a power transmission shaft but is not a speed change shaft, a gear member that has an engagement recess, and a claw member having an engaging claw that engages with the engagement recess and to which rotational power is transmitted. There are gaps in a rotational direction between the engaging claw and both ends, in the rotational direction, of the engagement recess.

6 Claims, 5 Drawing Sheets

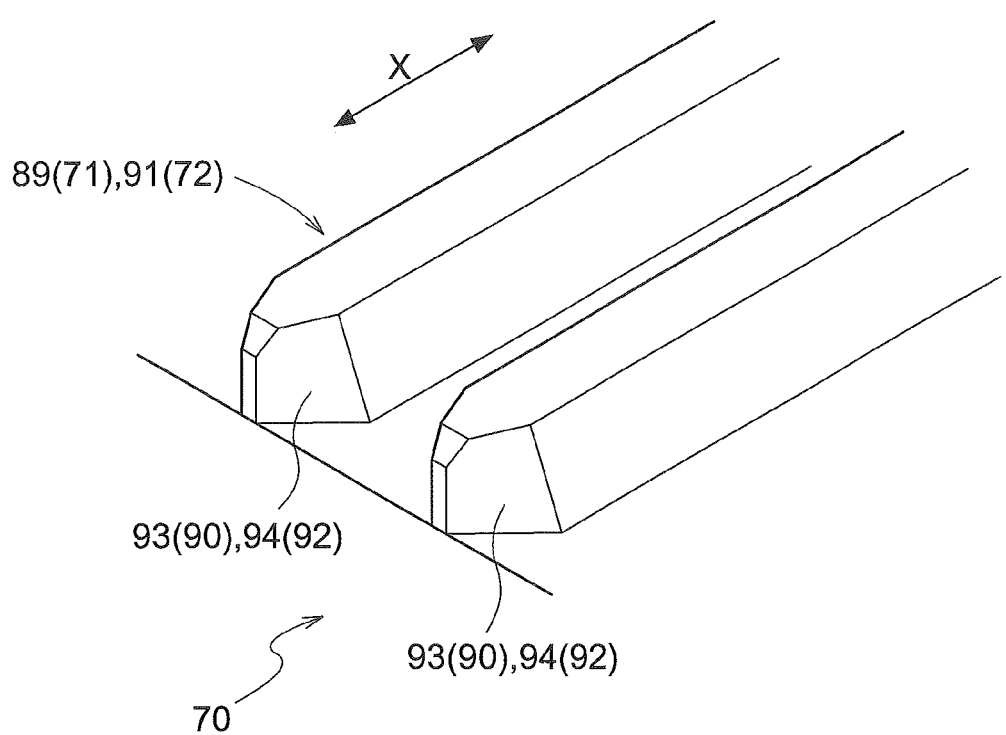

10,323,694 B2

WORK VEHICLE

CROSS-REFERENCE TO RELATED APPLICATION

This application claims priority to Japanese Patent Application No. 2016-126878 filed Jun. 27, 2016, the disclosure of which is hereby incorporated in its entirety by reference.

BACKGROUND OF THE INVENTION

Field of the Invention

The present invention relates to a work vehicle.

Description of the Related Art

For example, JP 2009-67081A discloses a conventional work vehicle provided with a transmission unit that can subject power from an engine to speed change, and output the obtained power. In this work vehicle, the transmission unit (referred to as "transmission" in this publication) is provided with: an input shaft to which rotational power from the engine is transmitted; a speed change shaft that can be interlocked and connected to the input shaft; and a power transmission shaft that is interlocked and connected to the speed change shaft. The speed change shaft is provided with a spline mechanism that is switchable, by an outer spline and an inner spline relatively sliding in an axial direction of the speed change shaft, between a non-engaged state, in which the outer spline and the inner spline are not meshed with each other and no rotational power is transmitted from the input shaft to the speed change shaft, and an engaged state, in which the outer spline and the inner spline are meshed with each other and rotational power is transmitted from the input shaft to the speed change shaft.

However, in the above-described conventional technique, when switching the spline mechanism from the non-engaged state to the engaged state, there are cases where, if there is a phase shift between the outer spline and the inner spline, the outer spline and the inner spline are not meshed with each other well, and the switching of the spline mechanism to the engaged state is difficult, preventing smooth speed change operation of the transmission unit.

In view of such problems, there is demand for a work vehicle in which smooth speed change operation of a transmission unit is possible.

SUMMARY OF THE INVENTION

According to the present invention, a work vehicle comprising:
an engine; and
a transmission unit configured to subject power from the engine to speed change, and output the power,
the transmission unit having;
an input shaft to which rotational power is transmitted from the engine;
a speed change shaft that can be interlocked and connected to the input shaft;
a power transmission shaft that is interlocked and connected to the speed change shaft;
a spline mechanism configured to switch, by an outer spline and an inner spline relatively sliding on the speed change shaft in an axial direction of the speed change shaft, between a non-engaged state, in which the outer spline and the inner spline are not meshed with each other and no rotational power is transmitted from the input shaft to the speed change shaft, and an engaged state, in which the outer spline and the inner spline are meshed with each other and rotational power is transmitted from the input shaft to the speed change shaft;
a gear member that has an engagement recess, and is disposed on a shaft that is provided in a power transmission path leading from the input shaft to the power transmission shaft but is not the speed change shaft; and
a claw member that has an engaging claw that engages with the engagement recess and to which rotational power is transmitted, the claw member being disposed on the shaft that is provided in the power transmission path leading from the input shaft to the power transmission shaft but is not the speed change shaft;
wherein there are gaps in a rotational direction between the engaging claw and both ends, in the rotational direction, of the engagement recess.

According to the present invention, when switching the spline mechanism from the non-engaged state to the engaged state in a state in which there is a phase shift between the outer spline and the inner spline, a gear tooth of the outer spline and a gear tooth of the inner spline are brought into contact with each other to generate a rotational reaction force, and the generated rotational reaction force is transmitted to the gear member and the claw member in the power transmission path. With this rotational reaction force, the engaging claw of the claw member moves in the gaps provided in the rotational direction in the engagement recess of the gear member, and the claw member and the gear member rotate relatively. A return action of this relative rotation of the claw member and the gear member can cause the outer spline and the inner spline to rotate relatively. As a result, a phase shift between the outer spline and the inner spline is eliminated, and a state is realized in which the outer spline and the inner spline can be meshed with each other, making it possible to switch the spline mechanism from the non-engaged state to the engaged state without difficulties.

Therefore, according to the present invention, smooth speed change operation of the transmission unit is possible.

In the above-described configuration, preferably,
the shaft that is not the speed change shaft is the power transmission shaft.

According to the configuration, the gear member and the claw member are provided on the power transmission shaft, which is located on the power transmission downstream side relative to the speed change shaft on which the spline mechanism is provided, and thus it is possible to achieve a simple configuration compared to a case where, for example, an intermediate shaft is arranged between the input shaft and the speed change shaft, and the gear member and the claw member are provided on this intermediate shaft.

In the above-described configuration, preferably,
the outer spline is provided on a speed change gear that is supported on the speed change shaft so as to be relatively rotatable, and
the inner spline is provided on a shifter that is supported on the speed change shaft so as to rotate together with the speed change shaft, the shifter being slidable in the axial direction.

According to the configuration, a constant mesh type gear transmission mechanism is realized in which speed change operation is performed by sliding the shifter on which the inner spline is provided, and thus an disadvantage such as, for example, breakage of a gear tooth of the gear is unlikely to occur compared to, for example, a sliding selective type gear transmission mechanism in which speed change operation is performed by sliding a sliding gear on which an outer spline is provided.

In the above-described configuration, preferably, a gear tooth of the outer spline is provided with, at an end on the inner spline side in the axial direction, an outer chamfer part that is tapered toward an edge in the axial direction.

According to the configuration, even if there is a phase shift between the outer spline and the inner spline, the inner spline is guided to the outer chamfer part of the outer spline when the outer spline and the inner spline slide while approaching each other, and it is thus easy to keep uniform spaces between the outer spline and the inner spline. Therefore, it is possible to smoothly mesh the outer spline with the inner spline.

In the above-described configuration, preferably, a gear tooth of the inner spline is provided with, at an end on the outer spline side in the axial direction, an inner chamfer part that is tapered toward an edge in the axial direction.

According to the configuration, even if there is a phase shift between the outer spline and the inner spline, the outer spline is guided to the inner chamfer part of the inner spline when the outer spline and the inner spline slide while approaching each other, and it is thus easy to keep uniform spaces between the outer spline and the inner spline. Therefore, it is possible to smoothly mesh the outer spline with the inner spline.

In the above-described configuration, preferably, the gaps provided in the rotational direction have a size such that the outer spline and the inner spline are relatively rotatable by one gear tooth or more.

According to the configuration, as a result of the engaging claw of the claw member rotating relatively in the gaps in the engagement recess of the gear member, the outer spline and the inner spline relatively rotate by one gear tooth or more, and it is thus possible to appropriately eliminate the phase shift between the outer spline and the inner spline based on the actions of the gear member and the claw member, irrespective of the level of the phase shift between the outer spline and the inner spline.

BRIEF DESCRIPTION OF THE DRAWINGS

FIG. 6 is a perspective view schematically illustrating the vicinity of the chamfer parts of the gear teeth of the spline mechanism.

DETAILED DESCRIPTION OF PREFERRED EMBODIMENTS

Hereinafter, an embodiment, which is an example of the present invention, will be described with reference to the drawings.

Figure 1:
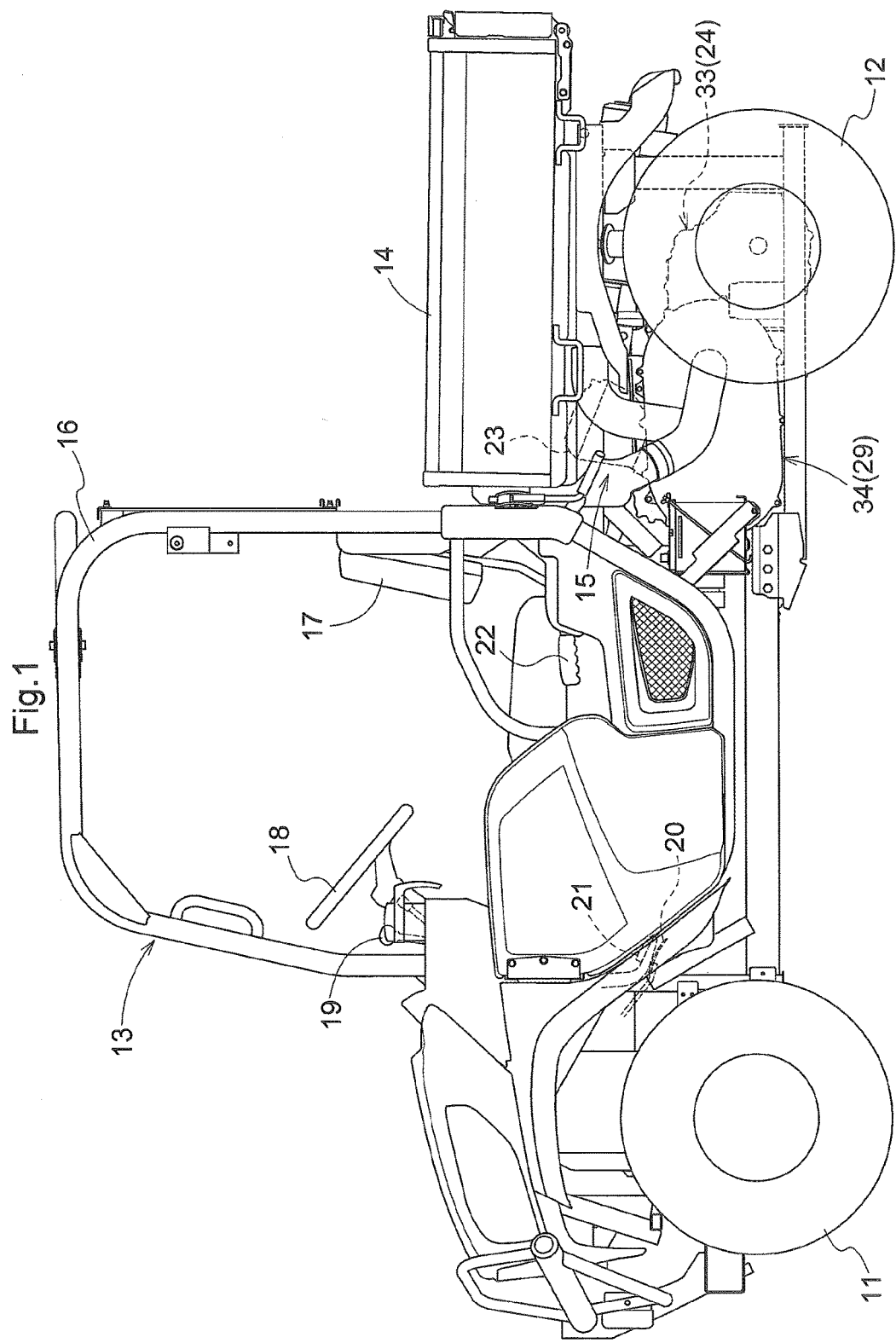
FIG. 1 is an overall side view illustrating a utility vehicle.

A utility vehicle (an example of a "work vehicle") shown in FIG. 1 is configured as a vehicle that can be used for various purposes such as load carriage or recreation. The utility vehicle is provided with a pair of left and right front wheels 11 serving as traveling devices that are drivable and steerable, and a pair of left and right rear wheels 12 serving as traveling devices that are drivable. In other words, the travel machine body of the utility vehicle is configured to be able to travel with the pair of left and right front wheels 11 and the pair of left and right rear wheels 12. In the center of the travel machine body, a driving part 13 that a driver boards to perform driving operation is provided. In the rear of the travel machine body, a loading platform 14 on which loads can be placed is provided. A prime mover part 15 is provided at a position that is lower than the loading platform 14 of the travel machine body.

The driving part 13 is enclosed and protected by a frame-shaped ROPS (rollover protective structure) frame 16. The driving part 13 is provided with a driving seat 17 on which the driver sits. The driving part 13 is further provided with: a steering handle 18 for steering the left and right front wheels 11; a shift lever 19 for speed change operation; a gas pedal 20 that can change a traveling speed; a brake pedal 21 that can subject the travel machine body to braking; a parking lever 22 that can operate a parking brake; and the like.

The prime mover part 15 is provided with a water-cooled type gasoline engine (an example of "engine"; hereinafter, abbreviated as "engine 23"), and a transmission unit 24 that can change power from the engine 23 to forward-movement power or backward-movement power, and can output the changed power.

Figure 2:
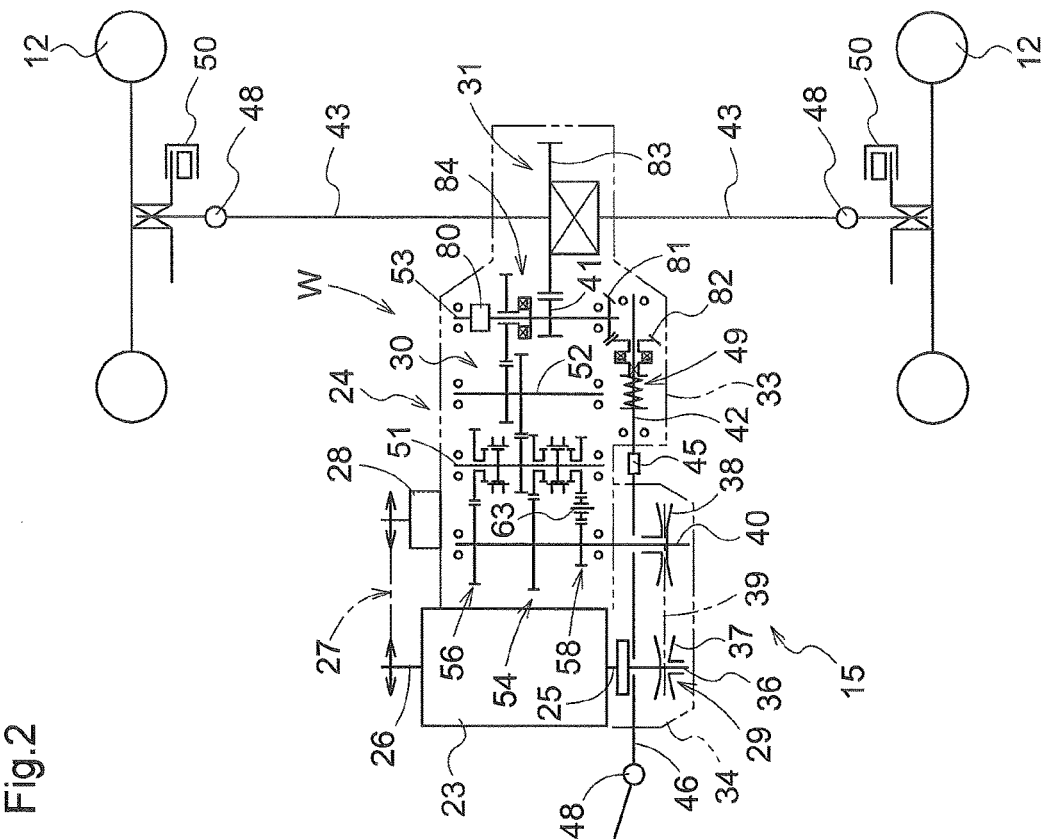
FIG. 2 is a plan view schematically illustrating a power transmission unit structure of the utility vehicle.
Figure 2:
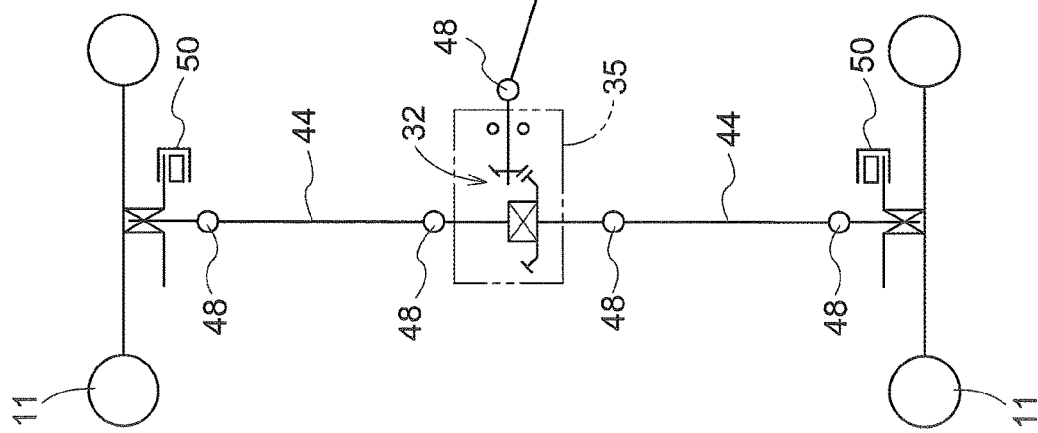

As shown in FIG. 2, the engine 23 is disposed in an orientation such that its crankshaft is directed in a lateral direction of the travel machine body. The engine 23 is provided with a main output shaft 25 that is integrally joined to the crankshaft, and a sub output shaft 26 that is integrally joined to the crankshaft. The sub output shaft 26 is located on the side that is opposite to the main output shaft 25 with the crankshaft interposed therebetween. An output of the main output shaft 25 is input to the transmission unit 24. An output of the sub output shaft 26 is input to an electric generator 28 constituted by an alternator or the like via a belt mechanism 27.

Transmission Unit

As shown in FIG. 2, the transmission unit 24 is provided with: a dry-belt type continuously variable transmission mechanism 29; a constant mesh type gear transmission mechanism 30; a rear wheel differential mechanism 31 that can generate a difference in speed between the left and right rear wheels 12; a front wheel differential mechanism 32 that can generate a difference in speed between the left and right front wheels 11, and the like.

The gear transmission mechanism 30 and the rear wheel differential mechanism 31 are accommodated in a transmission case 33 that is located adjacent to the rear portion of the engine 23. The belt type continuously variable transmission mechanism 29 is accommodated in a transmission case 34 that is located adjacent to the side portions of the engine 23 and the transmission case 33. The front wheel differential mechanism 32 is accommodated in a differential case 35 that is arranged forward of the engine 23.

The belt type continuously variable transmission mechanism 29 is provided with: a drive pulley 37 that is attached to a drive shaft 36 that can be interlocked and connected to the main output shaft 25 of the engine 23 via a centrifugal clutch; a driven pulley 38 that is located rearward of the drive pulley 37; and an endless belt 39 that is wound over the drive pulley 37 and the driven pulley 38.

The belt type continuously variable transmission mechanism 29 is configured to subject power from the engine 23 to stepless speed change, and output the obtained power to the gear transmission mechanism 30, in response to a change in the winding diameters of the drive pulley 37 and the driven pulley 38 depending on the rotational speed of the engine 23.

The gear transmission mechanism 30 is configured to receive the power input from the belt type continuously variable transmission mechanism 29 at an input shaft 40 that rotates together with the driven pulley 38, subject the power received at the input shaft 40 to speed change, and output the obtained power to a final gear 41 that is interlocked and connected to the rear wheel 12 side, and to a power extracting shaft 42 that can be interlocked and connected to the front wheel 11 side.

The rear wheel differential mechanism 31 outputs the power input from the final gear 41 to the left and right rear wheels 12 via a rear wheel drive shaft 43 that extends in a left-right direction of the machine body.

The front wheel differential mechanism 32 outputs the power input from the power extracting shaft 42 to the left and right front wheels 11 via a front wheel drive shaft 44 that extends in the left-right direction of the machine body. The power extracting shaft 42 and the front wheel differential mechanism 32 can be interlocked and connected to each other via a propulsion shaft 46 that extends from a joining section 45 of the power extracting shaft 42, and via a front wheel side input shaft 47 that extends obliquely frontward from the propulsion shaft 46.

Universal joints 48, which are configured by cardan joints for example, interlock and connect: the rear wheel drive shaft 43 and the rear wheels 12; the power extracting shaft 42 of the gear transmission mechanism 30 and the propulsion shaft 46; the propulsion shaft 46 and the front wheel side input shaft 47; and the front wheel drive shaft 44 and the front wheels 11.

A clutch unit 49, which is located between the gear transmission mechanism 30 and the front wheel differential mechanism 32, can switch as to whether or not power is transmitted to the front wheels 11. If the clutch unit 49 is ON, then the vehicle is in a state in which power is transmitted to the rear wheels 12 and the front wheels 11 (4-wheel drive state). On the other hand, if the clutch unit 49 is OFF, then the vehicle is in a state in which power is transmitted only to the rear wheels 12 and not to the front wheels 11 (2-wheel drive state).

The left and right front wheels 11 and the left and right rear wheels 12 are respectively provided with braking devices 50, which are configured by disk brake mechanisms. The braking devices 50 are interlocked and connected to the brake pedal 21 (see FIG. 1) via a master cylinder (not shown).

Gear Transmission Mechanism

Figure 3:
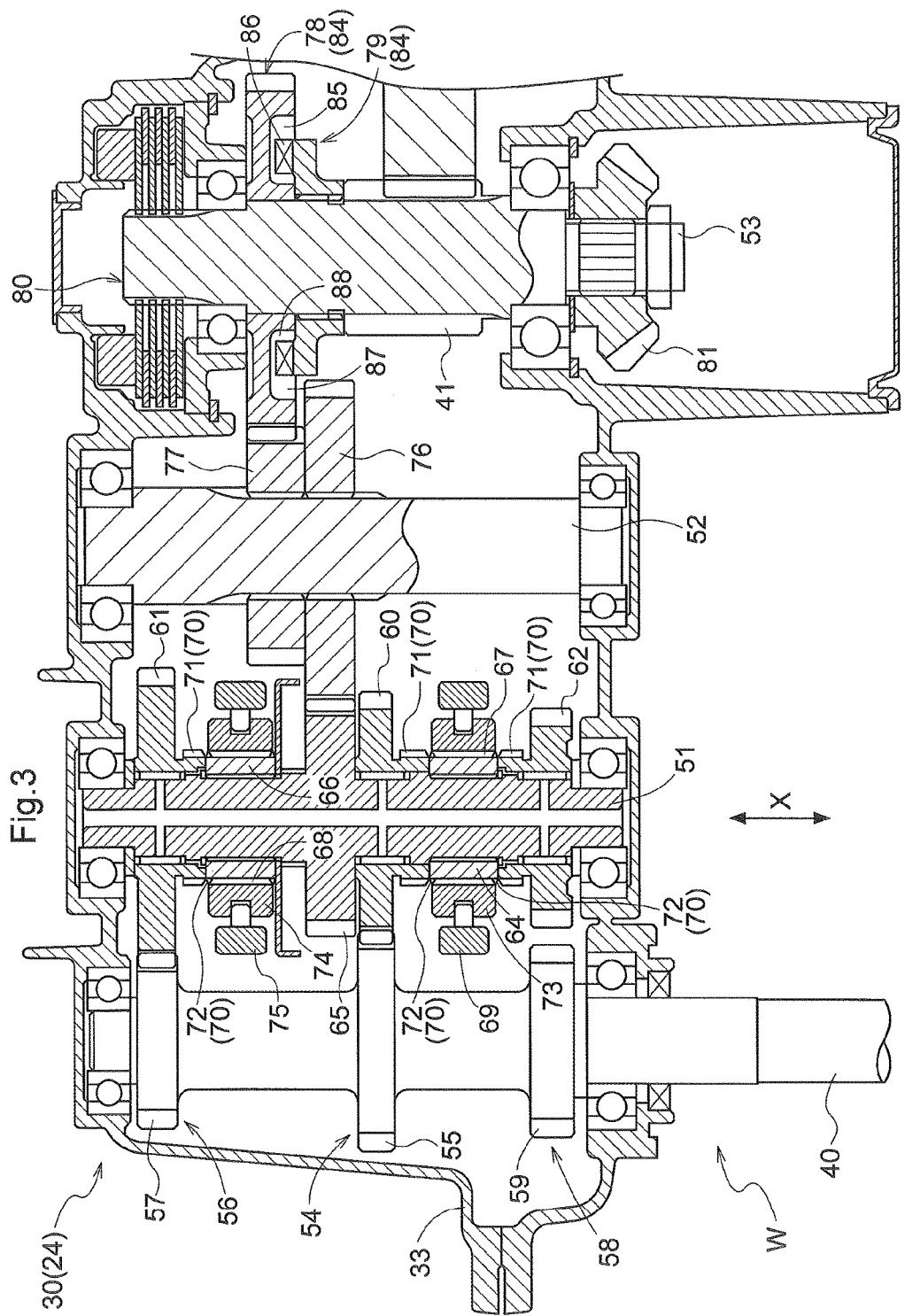
FIG. 3 is a partial cross-sectional view of a gear transmission mechanism.

As shown in FIGS. 2 and 3, the gear transmission mechanism 30 is provided with, as shafts for transmitting power, the input shaft 40, a speed change shaft 51, a relay shaft 52, and a power transmission shaft 53. The input shaft 40, the speed change shaft 51, the relay shaft 52, and the power transmission shaft 53 are held in the transmission case 33 so as to be rotatable. The input shaft 40, the speed change shaft 51, the relay shaft 52, and the power transmission shaft 53 are arranged in the gear transmission mechanism 30 in this order from the power transmission upstream side to the power transmission downstream side in a power transmission path W.

Rotational power is transmitted from the engine 23 to the input shaft 40. More specifically, rotational power of the engine 23 that was subjected to speed change by the belt type continuously variable transmission mechanism 29 is input to the input shaft 40.

A forward-movement first-speed drive gear 55 of a forward-movement first-speed gear mechanism 54, a forward-movement second-speed drive gear 57 of a forward-movement second-speed gear mechanism 56, and a backward-movement drive gear 59 of a backward-movement gear mechanism 58 are fixed to and supported on the input shaft 40 so as to rotate together with the input shaft 40.

A forward-movement first-speed driven gear 60 (serving as an example of the "speed change gear") of the forward-movement first-speed gear mechanism 54, a forward-movement second-speed driven gear 61 (serving as an example of the "speed change gear") of the forward-movement second-speed gear mechanism 56, and a backward-movement driven gear 62 (serving as an example of the "speed change gear") of the backward-movement gear mechanism 58 are supported on the speed change shaft 51 so as to be relatively rotatable. The forward-movement first-speed driven gear 60 is constantly meshed with the forward-movement first-speed drive gear 55. The forward-movement second-speed driven gear 61 is constantly meshed with the forward-movement second-speed drive gear 57. The backward-movement driven gear 62 is constantly meshed with the backward-movement drive gear 59 via a back gear 63 (see FIG. 2).

As shown in FIG. 3, a cylindrical first boss member 64 is fixed to and supported on the speed change shaft 51 at a position between the forward-movement first-speed driven gear 60 and the backward-movement driven gear 62 so as to rotate together with the speed change shaft 51. A first power transmitting gear 65 is fixed to and supported on the speed change shaft 51 so as to rotate together with the speed change shaft 51. A cylindrical second boss member 66 is fixed to and supported on the speed change shaft 51 at a position between the first power transmitting gear 65 and the forward-movement second-speed driven gear 61 so as to rotate together with the speed change shaft 51.

The first boss member 64 is provided with, on its outer circumferential portion, a first constant mesh spline 67 with a plurality of outer gear teeth arranged in its circumferential direction. The second boss member 66 is provided with, on its outer circumferential portion, a second constant mesh spline 68 with a plurality of outer gear teeth arranged in its circumferential direction.

The transmission unit 24 is provided with a plurality of (e.g., three) spline mechanisms 70 on the speed change shaft 51. The spline mechanisms 70 are provided for the respective gear mechanisms 54, 56, and 58. Each spline mechanism 70 is provided with an outer spline 71, and an inner spline 72 that can mesh with the outer spline 71.

Specifically, the spline mechanism 70 of the forward-movement first-speed gear mechanism 54 is provided with an outer spline 71 of the forward-movement first-speed driven gear 60, and an inner spline 72 that is provided on one end side of a first shifter 73 (serving as an example of a "shifter"), and can mesh with the outer spline 71 of the forward-movement first-speed driven gear 60. The spline mechanism 70 of the backward-movement gear mechanism 58 is provided with an outer spline 71 of the backward-movement driven gear 62, and an inner spline 72 that is provided on the other end side of the first shifter 73, and can mesh with the outer spline 71 of the backward-movement driven gear 62. The spline mechanism 70 of the forward-movement second-speed gear mechanism 56 is provided with an outer spline 71 of the forward-movement second-speed driven gear 61, and an inner spline 72 that is provided on one end side of a second shifter 74 (serving as an example of the "shifter"), and can mesh with the outer spline 71 of the forward-movement second-speed driven gear 61.

The inner spline 72 of the first shifter 73 is constantly meshed with the first constant mesh spline 67 of the first boss member 64. The first shifter 73 can slide in an axial direction X of the speed change shaft 51 using a first selector fork 69 that is interlocked and connected to the shift lever 19. Accordingly, it is possible to mesh the inner spline 72 of the first shifter 73 with the outer spline 71 of the forward-movement first-speed driven gear 60, or the outer spline 71 of the backward-movement driven gear 62.

The inner spline 72 of the second shifter 74 is constantly meshed with the second constant mesh spline 68 of the second boss member 66. The second shifter 74 can slide in the axial direction X of the speed change shaft 51 using a second selector fork 75 that is interlocked and connected to the shift lever 19. Accordingly, it is possible to mesh the inner spline 72 of the second shifter 74 with the outer spline 71 of the forward-movement second-speed driven gear 61.

A first power transmitted gear 76 that is constantly meshed with the first power transmitting gear 65, and a second power transmitting gear 77 are fixed to and supported on the relay shaft 52 so as to rotate together with the relay shaft 52.

The power transmission shaft 53 is interlocked and connected to the speed change shaft 51 via the relay shaft 52. A second power transmitted gear 78 (corresponding to a "gear member") that is constantly meshed with the second power transmitting gear 77 is supported on the power transmission shaft 53 so as to be relatively rotatable. A claw member 79 that is engaged with the second power transmitted gear 78 is fixed to and supported on the power transmission shaft 53 so as to rotate together with the power transmission shaft 53.

A parking mechanism 80, which is configured by a wet multiplate brake for example, is provided at one end of the power transmission shaft 53. The parking mechanism 80 can switch between a released state in which the power transmission shaft 53 can rotate freely based on the operation of the parking lever 22, and a parking state in which rotation of the power transmission shaft 53 is prevented.

A first power transmitting bevel gear 81 is fixed to the other end of the power transmission shaft 53. The first power transmitting bevel gear 81 is interlocked and connected to a first power transmitted bevel gear 82 that transmits power to the power extracting shaft 42.

The final gear 41 is fixed to and supported on the power transmission shaft 53 at a position between the claw member 79 and the first power transmitting bevel gear 81 so as to rotate together with the power transmission shaft 53. The final gear 41 is interlocked and connected to an input gear 83 of the rear wheel differential mechanism 31.

As described above, the foregoing gear transmission mechanism 30 of the transmission unit 24 can operate, as a result of the first selector fork 69 and the second selector fork 75 sliding in the axial direction X in accordance with operation of the shift lever 19.

Specifically, the first selector fork 69 and the second selector fork 75 are interlocked and connected to the shift lever 19 via a variable speed drum (not shown). The relationship between the operation position of the shift lever 19, and the positions of the first selector fork 69 and the second selector fork 75 is realized by the variable speed drum (not shown), although a description of the detailed structure is omitted.

When the shift lever 19 is operated to be at a forward-movement first-speed position, the first selector fork 69 slides the first shifter 73 to the forward-movement first-speed driven gear 60 side, and the forward-movement first-speed driven gear 60 and the first boss member 64 (speed change shaft 51) are interlocked and connected to each other by the first shifter 73. At this time, the second shifter 74 is not interlocked and connected to the forward-movement second-speed driven gear 61. Accordingly, a state in which the transmission unit 24 can output forward-movement first-speed power is realized. If, in this state, the gas pedal 20 (see FIG. 1) is stepped and operated, then the travel machine body travels in a forward-movement first-speed state.

When the shift lever 19 is operated to be at a forward-movement second-speed position, the second selector fork 75 slides the second shifter 74 to the forward-movement second-speed driven gear 61 side, and the forward-movement second-speed driven gear 61 and the second boss member 66 (speed change shaft 51) are interlocked and connected to each other by the second shifter 74. At this time, the first shifter 73 is interlocked and connected to the forward-movement first-speed driven gear 60 or the backward-movement driven gear 62. Accordingly, a state in which the transmission unit 24 can output forward-movement second-speed power is realized. If, in this state, the gas pedal 20 is stepped and operated, the travel machine body travels in a forward-movement second-speed state.

When the shift lever 19 is operated to be at a backward-movement position, the first selector fork 69 slides the first shifter 73 to the backward-movement driven gear 62 side, and the backward-movement driven gear 62 and the first boss member 64 (speed change shaft 51) are interlocked and connected to each other by the first shifter 73. At this time, the second shifter 74 is not interlocked and connected to the forward-movement second-speed driven gear 61. Accordingly, a state in which the transmission unit 24 can output backward-movement power is realized. If, in this state, the gas pedal 20 (see FIG. 1) is stepped and operated, the travel machine body travels in a backward-movement state.

When the shift lever 19 is operated to be at a neutral position, a state is realized in which the first shifter 73 is not interlocked and connected to the forward-movement first-speed driven gear 60 or the backward-movement driven gear 62, and the second shifter 74 is not interlocked and connected to the forward-movement second-speed driven gear 61. Accordingly, no power is transmitted from the input shaft 40 to the speed change shaft 51. As a result, a neutral state in which the transmission unit 24 does not output power is realized. In this state, the travel machine body is stopped. Note that FIG. 3 shows the state in which the transmission unit 24 is in the neutral state.

As described above, the speed change shaft 51 is interlocked and connected to the input shaft 40 in the forward-movement first-speed state, the forward-movement second-speed state, and the backward-movement state, whereas the speed change shaft 51 is not interlocked and connected to the input shaft 40 in the neutral state.

Spline Mechanism

As shown in FIG. 3, the spline mechanisms 70 for the respective gear mechanisms 54, 56, and 58 are each provided with the outer spline 71 that has multiple gear teeth arranged in an outer circumferential portion at equal intervals in its circumferential direction, and the inner spline 72 that has multiple gear teeth arranged in an inner circumferential portion at equal intervals in its circumferential direction.

Each spline mechanism 70 is configured to be switchable, by the outer spline 71 and the inner spline 72 relatively sliding in the axial direction X of the speed change shaft 51, between the non-engaged state, in which the outer spline 71 and the inner spline 72 are not meshed with each other and no rotational power is transmitted from the input shaft 40 to the speed change shaft 51, and the engaged state, in which the outer spline 71 and the inner spline 72 are meshed with each other and rotational power is transmitted from the input shaft 40 to the speed change shaft 51.

Claw Clutch Mechanism

Figure 4:
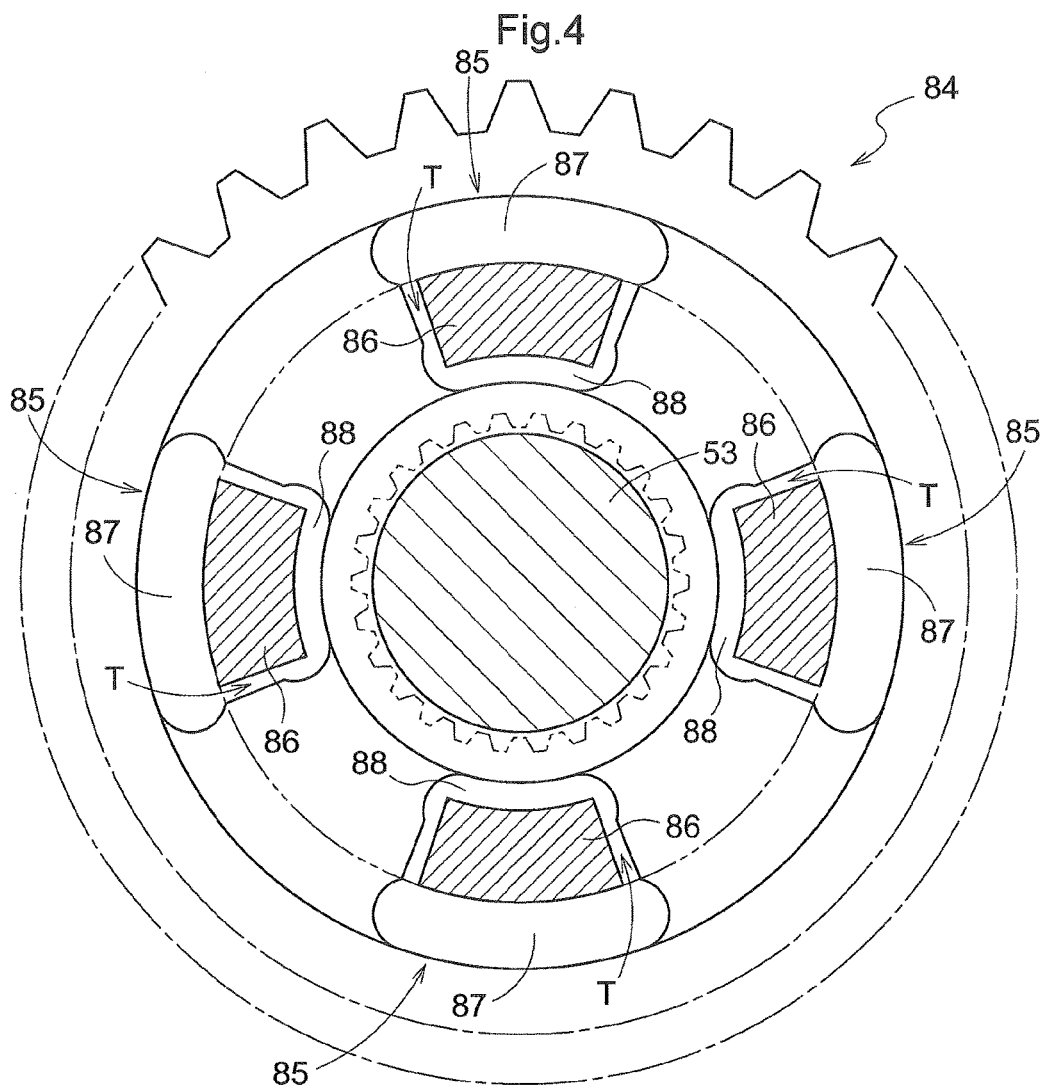
FIG. 4 is a partial cross-sectional view of a claw clutch structure.

As shown in FIGS. 2 to 4, the transmission unit 24 is provided with a claw clutch mechanism 84 that allows a shaft that is provided in the power transmission path W leading from the input shaft 40 to the power transmission shaft 53 but is not the speed change shaft 51 to have a play in a rotational direction of the shaft that transmits power in the power transmission path W. In this embodiment, the shaft that is provided in the power transmission path W but is not the speed change shaft 51 is the power transmission shaft 53.

As shown in FIGS. 3 and 4, the claw clutch mechanism 84 is provided with the second power transmitted gear 78 having engagement recesses 85, and the claw member 79 having a plurality of (e.g., four) engaging claws 86 that engage with the engagement recesses 85 so that rotational power is transmitted.

As shown in FIG. 4, there are gaps T in the rotational direction between both ends, in the rotational direction, of the engagement recesses 85 of the second power transmitted gear 78, and the engaging claws 86 of the claw member 79. The gaps T in the rotational direction have a size such that the outer spline 71 and the inner spline 72 are relatively rotatable by one gear tooth or more.

Each engagement recess 85 is provided with an outer void part 87 that is arranged on the outer side with respect to the engaging claw 86, and an inner void part 88 that is arranged on the inner side with respect to the engaging claw 86. The outer void part 87 have ends in the circumferential direction that are rounded and expanded so as to have a larger circumferential length than that at the position at which the contact surface with the engaging claw 86 is located. The inner void part 88 have ends in the circumferential direction that are rounded and expanded so as to have a larger circumferential length than that at the position at which the contact surface with the engaging claw 86 is located.

Chamfer Part

Figure 5:
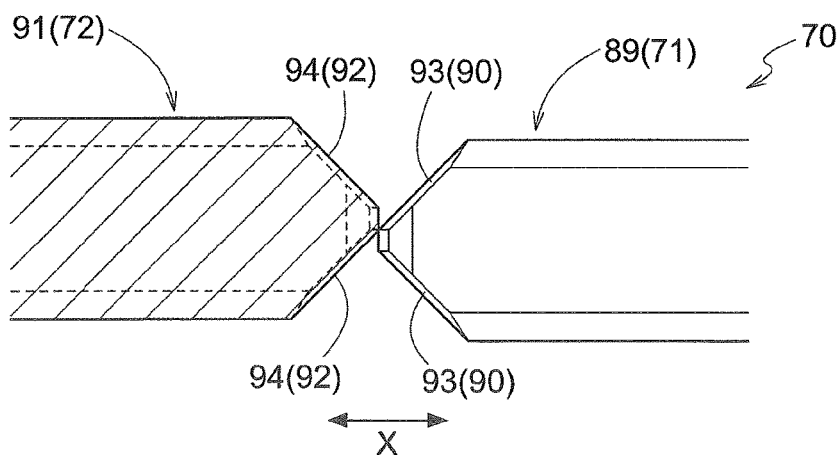
FIG. 5 illustrates the vicinity of chamfer parts of gear teeth of a spline mechanism.

As shown in FIGS. 5 and 6, an outer gear tooth 89 of the outer spline 71 (corresponding to "gear tooth of the outer spline") is provided with, at an end on the inner spline 72 side in the axial direction X, an outer chamfer part 90 that is tapered toward the edge side in the axial direction X. An inner gear tooth 91 of the inner spline 72 (corresponding to "gear tooth of the inner spline") is provided with, at an end on the outer spline 71 side in the axial direction X, an inner chamfer part 92 that is tapered toward the edge side in the axial direction X. Note that in the present embodiment, the outer chamfer part 90 of the outer gear tooth 89 of the outer spline 71 and the inner chamfer part 92 of the inner gear tooth 91 of the inner spline 72 have structures that correspond to each other, and thus FIG. 6 schematically shows the outer chamfer part 90 and the inner chamfer part 92 as having the same structure.

As shown in FIG. 5, the outer chamfer part 90 has outer chamfer surfaces 93 at both ends in the rotational direction. The outer chamfer surfaces 93 of the outer chamfer part 90 are inclined with respect to the axial direction X. The inner chamfer part 92 has inner chamfer surfaces 94 at both ends in the rotational direction. The inner chamfer surfaces 94 of the inner chamfer part 92 are inclined with respect to the axial direction X.

As shown in FIGS. 5 and 6, the outer chamfer surfaces 93, and the inner chamfer surfaces 94 for contacting the outer chamfer surfaces 93 have the same inclination angle. In other words, at the beginning of mesh of the outer spline 71 and the inner spline 72, the outer chamfer surfaces 93 and the inner chamfer surfaces 94 are brought into surface contact with each other using the contact surfaces that are inclined with respect to the axial direction X. Providing such contact surfaces makes it easy to mesh the outer spline 71 with the inner spline 72, and also makes it easy, when the outer spline 71 and the inner spline 72 are brought into contact with each other with their phases shifted from each other, for a rotational reaction force generated due to the contact of the outer spline 71 and the inner spline 72 to be transmitted to the claw clutch mechanism 84, thus allowing smooth elimination of the phase shift between the outer spline 71 and the inner spline 72.

With the above-described configuration, even if the phases of the outer spline 71 and the inner spline 72 are shifted, a force generated when the outer spline 71 and the inner spline 72 are brought into contact with each other is transmitted to the second power transmitted gear 78 of the claw clutch mechanism 84 via the speed change shaft 51, the relay shaft 52, or the like. Also, as a result of the engaging claws 86 of the claw member 79 relatively rotating in the gaps T provided in the rotational direction in the engagement recesses 85 of the second power transmitted gear 78, the second power transmitted gear 78 is rotated slightly. As a result, the inner spline 72 is slightly rotated in tandem with the second power transmitted gear 78, and the phase shift between the outer spline 71 and the inner spline 72 is eliminated, achieving a smooth mesh of the outer spline 71 and the inner spline 72. Furthermore, since the outer chamfer surfaces 93 are provided at an end of the outer gear tooth 89 of the outer spline 71, and the inner chamfer surfaces 94 are provided at an end of the inner gear tooth 91 of the inner spline 72, the range in which the outer spline 71 and the inner spline 72 are not meshed with each other is small. This also makes it easy for the outer spline 71 and the inner spline 72 to be meshed with each other. Accordingly, smooth speed change operation of the transmission unit 24 using the shift lever 19 is possible.

Other Embodiments

Hereinafter, other embodiments of the present invention will be described. Embodiments below may be combined with each other as long as they are not inconsistent, and the combinations may be applied to the above-described embodiment. Note that the scope of the present invention is not limited to the content of these embodiments.

[1] The above-described embodiment has described an example in which a shaft that is provided in the power transmission path W leading from the input shaft 40 to the power transmission shaft 53 but is not the speed change shaft 51 is the power transmission shaft 53, but the present invention is not limited to this. For example, the shaft that is not the speed change shaft 51 may also be the relay shaft 52, or an intermediate shaft that is arranged between the input shaft 40 and the speed change shaft 51, for example. In other words, it is also possible that the claw member 79 and the engaging claws 86 of the claw clutch mechanism 84 are provided on the relay shaft 52, or the intermediate shaft arranged between the input shaft 40 and the speed change shaft 51.

[2] The above-described embodiment has described an example in which the claw member 79 has four engaging claws 86, but the present invention is not limited to this. The number of the engaging claws 86 of the claw member 79 may be changed to any one of 1 to 3, 5, or more. In this case, the number of the engagement recesses 85 of the second power transmitted gear 78 is also adjusted based on the number of the engaging claws 86 of the claw member 79.

[3] The above-described embodiment has described the constant mesh type gear transmission mechanism 30 as an example, but the present invention is not limited to this. Instead of this, for example, another sliding selective type gear transmission mechanism that has a slidable sliding gear may be used. In this case, an inner spline 72 is arranged on the sliding gear, and an outer spline 71 is arranged on a boss member that can be interlocked and connected to the sliding gear.

[4] The above-described embodiment has described an example in which the gap T in the rotational direction has a size such that the outer spline 71 and the inner spline 72 are relatively rotatable by one gear tooth or more, but the present invention is not limited to this. It is sufficient that the gap T has a size such that the front end of the outer chamfer part 90 and the front end of the inner chamfer part 92 can be separated from the range in which they overlap each other.

[5] The above-described embodiment has described an example in which both the outer chamfer part 90 and the inner chamfer part 92 are provided, but the present invention is not limited to this. It is also possible that, for example, only one of the outer chamfer part 90 and the inner chamfer part 92 is provided. Furthermore, it is also possible that, for example, neither of the outer chamfer part 90 and the inner chamfer part 92 are provided. In this case, the end surface at an end, without the outer chamfer part 90, of the outer gear tooth 89 of the outer spline 71, and the end surface of an end, without the inner chamfer part 92, of the inner gear tooth 91 of the inner spline 72 are parallel to the axial direction X.

[6] The above-described embodiment has described the utility vehicle as an example, but the work vehicle may be another work vehicle such as a tractor, a mower, a combine, a rice planting machine, or a constructing machine.

What is claimed is:

1. A work vehicle comprising:
    an engine; and
    a transmission unit configured to subject power from the engine to speed change, and output the power,
    the transmission unit having;
    an input shaft to which rotational power is transmitted from the engine;
    a speed change shaft that can be interlocked and connected to the input shaft;
    a power transmission shaft that is interlocked and connected to the speed change shaft;
    a spline mechanism configured to switch, by an outer spline and an inner spline relatively sliding on the speed change shaft in an axial direction of the speed change shaft, between a non-engaged state, in which the outer spline and the inner spline are not meshed with each other and no rotational power is transmitted from the input shaft to the speed change shaft, and an engaged state, in which the outer spline and the inner spline are meshed with each other and rotational power is transmitted from the input shaft to the speed change shaft;
    a gear member that has an engagement recess; and
    a claw member that has an engaging claw that engages with the engagement recess and to which rotational power is transmitted,
    wherein both of the gear member and the claw member are disposed on either one of the power transmission shaft or an intermediate shaft provided in a power transmission path leading from the input shaft to the power transmission shaft;
    wherein there are gaps in a rotational direction between the engaging claw and both ends, in the rotational direction, of the engagement recess.

2. The work vehicle according to claim 1, wherein:
the gear member and the claw member are disposed on the power transmission shaft.

3. The work vehicle according to claim 1, wherein:
the outer spline is provided on a speed change gear that is supported on the speed change shaft so as to be relatively rotatable, and
the inner spline is provided on a shifter that is supported on the speed change shaft so as to rotate together with the speed change shaft, the shifter being slidable in the axial direction.

4. The work vehicle according to claim 1, wherein:
a gear tooth of the outer spline is provided with, at an end on the inner spline side in the axial direction, an outer chamfer part that is tapered toward an edge in the axial direction.

5. The work vehicle according to claim 1, wherein:
a gear tooth of the inner spline is provided with, at an end on the outer spline side in the axial direction, an inner chamfer part that is tapered toward an edge in the axial direction.

6. The work vehicle according to claim 1, wherein:
the gaps provided in the rotational direction have a size such that the outer spline and the inner spline are relatively rotatable by one gear tooth or more.

* * * * *